(No Model.)
P. WIEDERER.
TOILET CASE AND TRIPLICATE MIRROR.
No. 393,679. Patented Nov. 27, 1888.
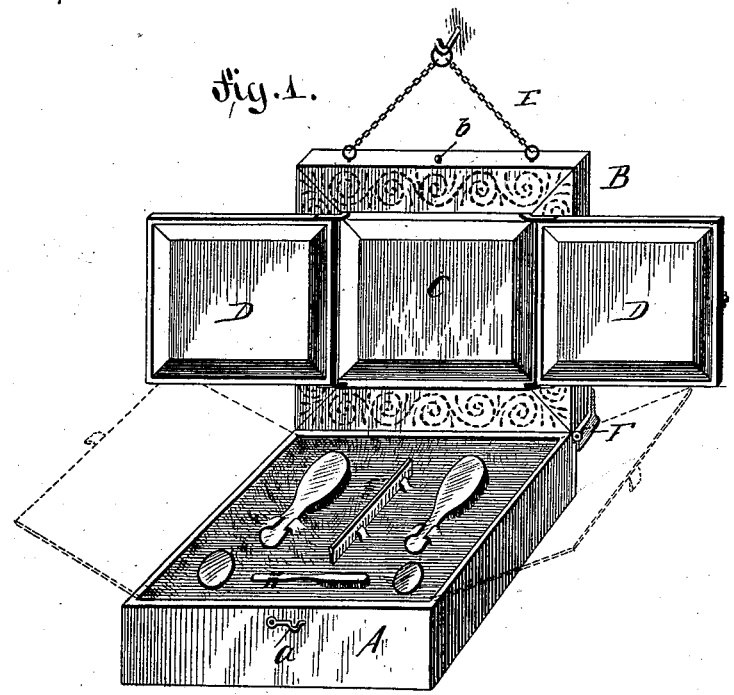
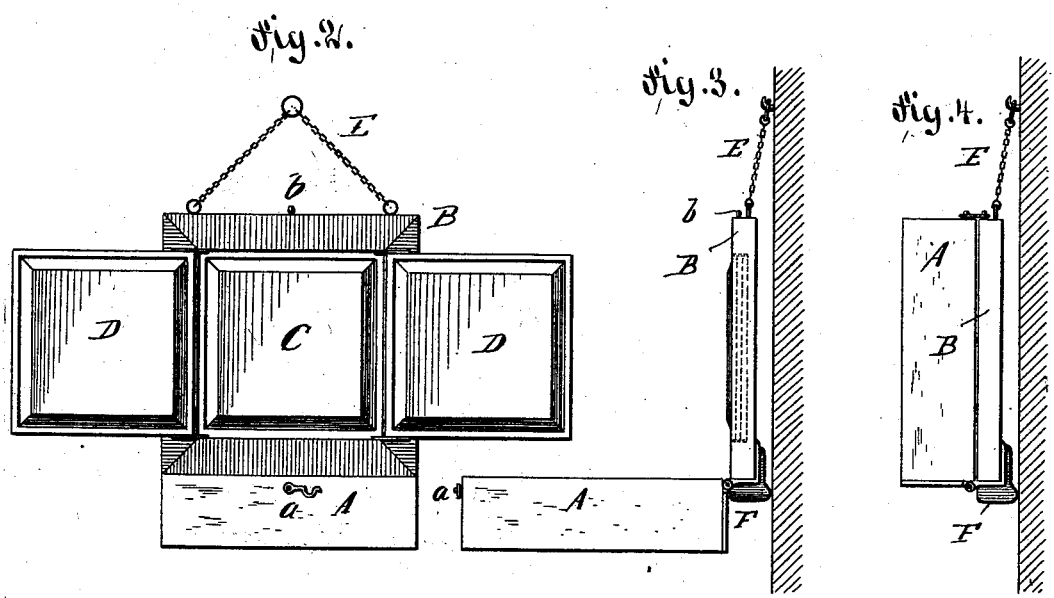

UNITED STATES PATENT OFFICE.

PETER WIEDERER, OF STAPLETON, NEW YORK.

TOILET-CASE AND TRIPLICATE MIRROR.

SPECIFICATION forming part of Letters Patent No. 393,679, dated November 27, 1888.

Application filed June 20, 1888. Serial No. 277,681. (No model.)

*To all whom it may concern:*

Be it known that I, PETER WIEDERER, of Stapleton, in the county of Richmond and State of New York, have invented certain new and useful Improvements in Combined Toilet-Case and Triplicate Mirror, of which the following is a specification.

The object of my invention is to provide a new and improved combined triplicate mirror and toilet-case which can be folded very compactly and readily opened for use.

The invention consists in the combination, with a box, of a hinged cover in the same, a mirror on the inner surface of said cover, and a mirror hinged to the cover at each side edge of the above-mentioned mirror.

The invention also consists in the construction and combination of parts and details, as will be fully described and set forth hereinafter, and then pointed out in the claims.

In the accompanying drawings, Figure 1 is a perspective view of any improved combined triplicate mirror and toilet-case, the same being opened for use. Fig. 2 is a front view of the same opened. Fig. 3 is a side view of the same opened. Fig. 4 is a side view of the same closed.

Similar letters of reference indicate corresponding parts.

The box A, which may be covered with plush, satin, leather, metal, or any other suitable material and ornamented according to any suitable design, is provided with a suitable lining and receptacles, pockets, or recesses for receiving combs, brushes, powder-boxes, &c., all in the well-known manner.

The box A is provided with the cover B, hinged to the same at one end, the box being also provided with the hook $a$ and the cover with the headed stud $b$, or vice versa; or any other suitable fastening device may be provided.

If desired, the box A may be provided with additional intermediate covers, as shown in dotted lines in Fig. 1.

On the inner surface of the cover B the main mirror C is secured, and at the side edges of the same the two wing-mirrors D are hinged to said cover in any suitable manner, so that they can be folded over and upon the main mirror C. On the swinging edge of the cover B the chain E, or an analogous device for suspending the said cover from a hook, is secured. At the hinged edge of the cover the stops F are secured, which hold the cover a short distance from the wall or support, and also to prevent the box A from swinging down any farther than into a position at right angles to the cover.

When the toilet-case and mirror are not in use, the wing-mirrors D are folded on the inner mirror, C, and the box A is swung up into the position shown in Fig. 4 and locked in place. The bottom of the box will then be exposed to view, and said bottom may be ornamented more or less elaborately, as may be desired.

When the toilet-case and mirror are to be used, the box is unhooked from the cover and swung down into the position shown in Figs. 1, 2, and 3, and the wing-mirrors swung from the main or central mirror.

The box A can be placed upon a table and the cover raised.

Having thus described my invention, what I claim as new, and desire to secure by Letters Patent, is—

1. The combination, with a toilet-box, of a hinged cover on the same, a mirror on the inner side of said cover, and wing-mirrors hinged on the cover at the side edges of the above-mentioned mirror, substantially as herein shown and described.

2. The combination, with a toilet-box, of a hinged cover on the same, a mirror secured on the inner side of the cover, wing-mirrors hinged to the cover at the side edges of the above-mentioned mirror, and a suspending device on the swinging end of said cover, substantially as herein shown and described.

3. The combination, with a toilet-box, of a hinged cover on the same, a mirror on the inner surface of said hinged cover, a mirror hinged to the cover at each side edge of the above-mentioned mirror, a suspending device on the swinging end of the cover, and stops at the hinged end of the cover, substantially as herein shown and described.

In testimony that I claim the foregoing as my invention I have signed my name in presence of two subscribing witnesses.

PETER WIEDERER.

Witnesses:
OSCAR F. GUNZ,
CARL KARP.